(No Model.)
F. E. LUX.
SELF CLEANING WEED CUTTER.
No. 447,781. Patented Mar. 10, 1891.
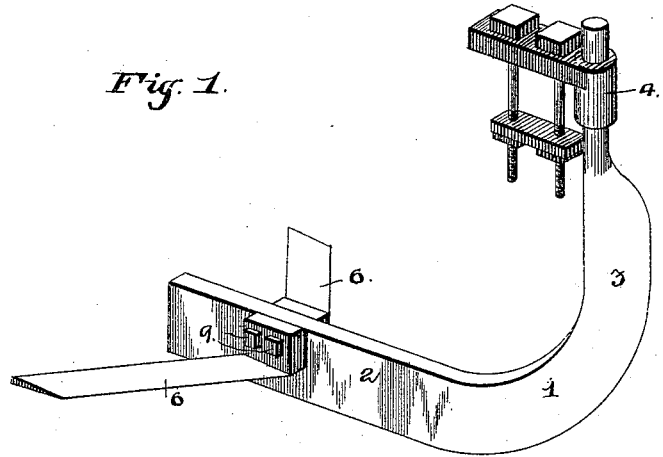
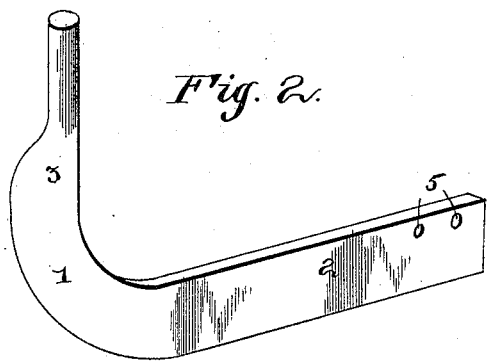
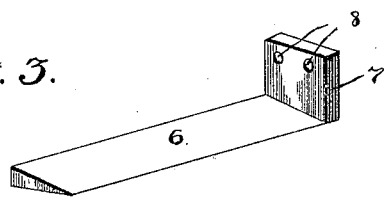
Witnesses
Horace G. Seitz
H. F. Riley
Inventor
Frederick E. Lux,
By his Attorneys,
C. A. Snow & Co.

UNITED STATES PATENT OFFICE.

FREDERICK E. LUX, OF WALLA WALLA, WASHINGTON.

SELF-CLEANING WEED-CUTTER.

SPECIFICATION forming part of Letters Patent No. 447,781, dated March 10, 1891.

Application filed June 28, 1890. Serial No. 357,141. (No model.)

*To all whom it may concern:*

Be it known that I, FREDERICK E. LUX, a citizen of the United States, residing at Walla Walla, in the county of Walla Walla and State of Washington, have invented new and useful Improvements in Self-Cleaning Weed-Cutters, of which the following is a specification.

The invention relates to improvements in self-cleaning weed-cutters.

The object of the present invention is to simplify, strengthen, and improve the construction of self-cleaning weed-cutters set forth in Patent No. 399,337, granted me March 12, 1890, and enable the weed-cutter to be readily attached to the ordinary form of curved colters.

The invention consists in the construction and novel combination and arrangement of parts hereinafter fully described, illustrated in the accompanying drawings, and pointed out in the claim hereto appended.

In the drawings, Figure 1 is a perspective view of the improved weed-cutter shown applied in operative position to a colter. Fig. 2 is a detail perspective view of the colter. Fig. 3 is a similar view of one of the horizontal blades.

Referring to the drawings, 1 designates a curved colter or cutter having a horizontal portion and the vertical portion 3 and provided with a cutting-edge upon both of said portions. The colter is provided at its upper end with a clamp 4, by means of which it can be readily attached to the beam of a cultivator, and in the upper edge of the horizontal portion 2 is provided with horizontal perforations 5, through which pass bolts that secure the blades 6 of the weed-cutter to the colter. The blades 6 are provided at their inner or front ends with vertical flanges 7, which are arranged upon opposite sides of the horizontal portion of the colter and are provided with perforations 8, that register with the perforations 5 and receive the bolts 9, by means of which the blades are secured to the colter. The blades are arranged in a horizontal plane, and when attached to the colter form a V-shaped weed-cutter having rearwardly-diverging blades.

In practice the colter is secured to the beam of a harrow or cultivator, or to a frame especially designed for that purpose, and a number of cutters are attached to each frame, and they are arranged in such relative positions that the blades will not contact with each other while their several paths of travel overlap, thus insuring the cutting of all weeds and at the same time preventing the accumulation of the weeds upon the cutter.

It will readily be seen that the manner of attaching the blades to the colter is extremely simple and inexpensive and enables the blades to be readily attached to any colter in use, it only being necessary to make the perforations 5, and that great strength is obtained sufficient to withstand the strains incident to the use of a weed-cutter.

Having thus described my invention, what I claim is—

The combination of the colter provided with perforations 5, the rearwardly-diverging horizontal blades 6, provided with vertical blocks or flanges 7, formed integral with the blades and arranged at the inner ends of the same and at an acute angle to the same, and provided with perforations, and having their upper edges flush with the upper edges of the colter and arranged at the same point along the colter, and the bolts passing through the colter and both blocks or flanges, substantially as described.

In testimony that I claim the foregoing as my own I have hereto affixed my signature in presence of two witnesses.

FREDERICK E. LUX.

Witnesses:
W. O'DONNELL,
R. G. PARK.